No. 857,077. PATENTED JUNE 18, 1907.
L. LABRECK.
TOOL.
APPLICATION FILED MAR. 6, 1907.
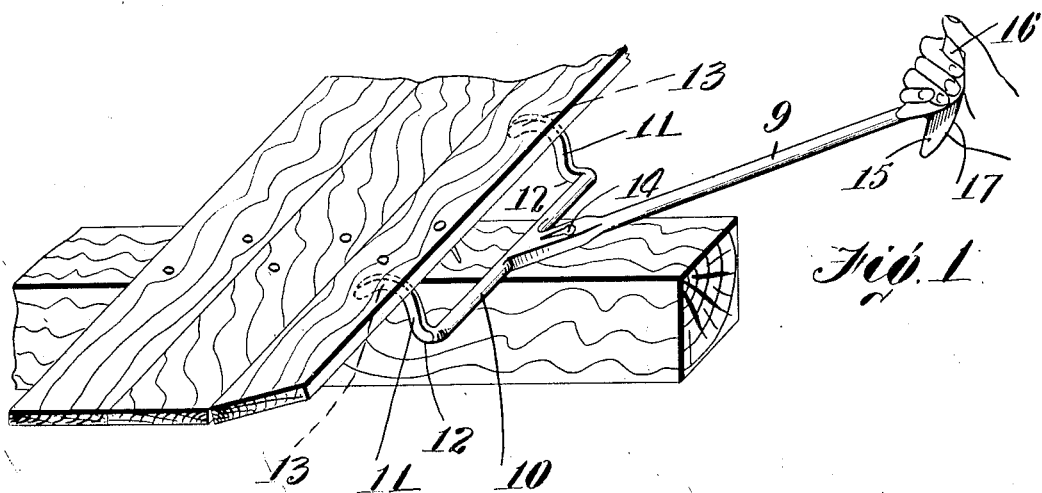
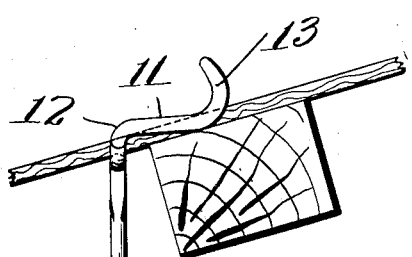
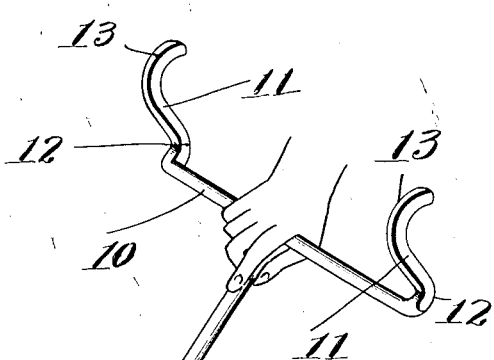
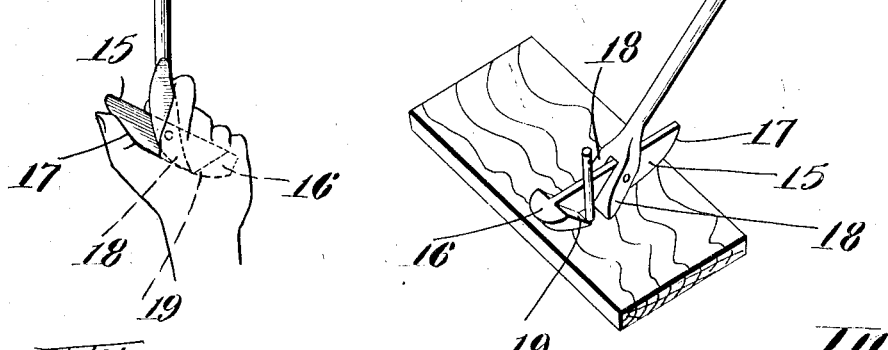
Witnesses:
C. F. Wesson
E. M. Allen
Inventor:
L. Labreck.
By Attorneys
Southgate & Southgate

UNITED STATES PATENT OFFICE.

LOUIS LABRECK, OF MILLBURY, MASSACHUSETTS.

TOOL.

No. 857,077.  Specification of Letters Patent.  Patented June 18, 1907.

Application filed March 6, 1907. Serial No. 360,830.

*To all whom it may concern:*

Be it known that I, LOUIS LABRECK, a citizen of the United States, residing at Millbury, in the county of Worcester and State of Massachusetts, have invented a new and useful Tool, of which the following is a specification.

This invention relates to an implement capable of use in many ways but especially adapted for the purpose of separating articles which are nailed or screwed together; for example, for separating rails from ties or boards from joists or uprights.

The principal objects of the invention are to provide means whereby the implement can be applied in such a manner that the whole width of the board or other article to be removed can be acted upon without applying all the force at any one part of the surface thereof; to provide means whereby a very efficient leverage is secured by the employment of a rocking bearing surface which will move in accordance with the existing conditions, so that a firm hold can be secured and the device can be moved along if necessary from one end of a board to the other without any sacrifice in the leverage; to provide means whereby the implement may be used in any necessary position in such a manner as to have all its advantages independently of the particular relation of the two articles to be separated; to provide an efficient handle grip for the implement which may be so constructed as to be well adapted for pulling nails and which when so used will be assisted by the form of the implement itself, the same being used in that case as a handle; and to make the implement itself of such form as to assist in pulling nails, the device having in all its uses a rocking bearing surface and an efficient handle grip.

Further objects and advantages of the invention will appear hereinafter.

Reference is to be had to the accompanying drawings in which,

Figure 1 is a perspective view of an implement constructed in accordance with this invention showing one of the several uses thereof. Fig. 2 is a side view showing another way in which the device can be used, and Fig. 3 is a perspective view showing the implement used as a nail puller.

Of the many uses to which this implement may be applied, that of removing boards from floors and other parts of buildings has been selected for the purpose of illustrating the utility of the invention.

The invention will be described first with special reference to the use of the device in the manner indicated in Fig. 1. It will be seen that the implement has a handle 9 preferably consisting of a straight bar. At the end of this handle is a cross bar 10 preferably of round iron at right angles to the handle. From the ends of this cross bar extend a pair of arms 11, each arm comprising a bow 12 of short curvature extending from the cross-bar in the plane in which the handle is located and bending upwardly as the instrument is illustrated in this figure. The arms terminate in bowed portions 13 preferably having a longer radius of curvature, which are intended to bear upon the work on which the tool is to be employed.

Considering the features of the invention so far mentioned, it will be seen that when the tool is used as shown in Fig. 1, the cross-bar acts as a rocking bearing surface for the lever, the two bows 13 of the arms serving to engage the board while if the board or the like is below the joist and is to be pulled down the bows constitute the bearing surface. As the lever is rocked on its pivot, the bows 13 may move on the surface of the board and the whole implement may be forced inwardly to permit the operator to use the device continuously without placing it under each board individually. When the device is used in the way shown in Fig. 2, the bowed portions 13 constitute the rocking bearing surfaces and the cross-bar serves to engage the board or the like to be removed. In either of these ways the implement may be used for horizontal or vertical work.

The way of using the device shown in Fig. 2, is especially adapted for removing floor and roof boards from below. In this case it is shown as used on a horizontal joist or the like instead of an upright. It will be observed that the bows 12 are formed by portions extending outwardly from the ends of the cross-bar in the plane of the handle. This is to permit another use of the device in which a perforation 14 through the handle is used as a nail puller. When this is employed in substantially the position indicated in Fig. 1, the cross-bar may serve as a bearing surface but ordinarily the bows 13 will constitute the bearing surface of the lever and as these are curved, the lever is adapted to rock about them so that the rocking bearing surface idea is preserved in either case. By the use of such a rocking bearing surface either when pulling nails or spikes or removing boards, rails, or the like, the implement can be swung on a rocking and constantly shifting pivot which secures efficient action of the device without marring the woodwork upon which the bearing surface is placed.

As best shown in Fig. 2, it will be seen that a special form of grip is preferably employed at the end of the handle. This is shown in the form of a bar 15 extending across the handle in a slanting direction and having a wide surface 16 at one side of the handle, and a curved extension 17 at the other side for a thumb hold. From the position of this grip in Fig. 2, it will be seen that the hand of the operator gets a firm hold to enable the implement to be used in the manner indicated. This bar 15 may be pivoted to the end of the handle and when this is done, as indicated in the drawings, the grip is adapted to be used as a nail puller thus giving the device an additional advantage. Fig. 3 indicates the way in which the implement is used when the grip is employed in this manner. Here it will be seen that the end of the handle terminates in two jaws 18 each having a wide face and separated from each other by a slot through which the bar 15 passes and to which the same is pivoted. The outer surfaces of these jaws are substantially continuous with the outer surface 16 of the wide part of the grip which has been described. This grip also has a pair of jaws 19 co-acting with the jaws 18 and capable of use in the manner indicated in Fig. 3 to pull nails or spikes. The two sets of jaws constitute stops to hold the bar 15 in proper position to serve efficiently as a grip. As the inward extension 16 of the grip has a curved outer surface which constitutes a rocking bearing surface for the nail puller, it will be seen that a great leverage can be obtained and that the device is capable of use for pulling nails or spikes without heads. When so used, the cross-bar is conveniently employed as a grip for the handle, if it is operated with one hand as indicated, but when operated by both hands as in pulling spikes the two arms 11 are grasped in an obvious manner. It will be seen, therefore, that while the handle grip is of such form as to be of special advantage when the device is used in the manner indicated in Fig. 2, either when operated in a vertical or horizontal position, yet this grip is so constructed as to constitute an efficient and improved nail puller, the efficiency of which is increased by the form of the principal portion of the tool being conveniently shaped to serve as a hand grip.

While I have illustrated and described a particular form in which I prefer to embody the invention, I am aware that many modifications may be made therein without exceeding the scope of the invention as expressed in the claims. This is especially the case when the device is to be used for the many different purposes for which it is adapted; when it is to be used as a device for separating rails from ties, for example, it is of course constructed in a more massive form.

Having thus fully described my invention, what I claim and desire to secure by Letters-Patent is:—

1. As an article of manufacture, a tool having a handle, a rocking bearing surface, a cross-bar between the bearing surface and handle, and a grip located at the opposite end of the handle and inclined with respect thereto, said grip having a wide face on one side and a projection on the other side at an acute angle with the handle, the wide part of the grip serving as a grip for the fingers and the projection for the thumb.

2. As an article of manufacture, a tool having a handle, a cross-bar at the end thereof, curved arms extending from the cross-bar and constituting a rocking bearing surface, and a grip pivoted to the other end of the bar, said grip having a wide face on one side and a narrow one on the other at an acute angle to the bar, said faces having substantially continuously curved outer surfaces.

In testimony whereof I have hereunto set my hand, in the presence of two subscribing witnesses.

LOUIS LABRECK.

Witnesses:
ARTHUR W. HALL,
JOSEPHINE C. GODDARD.